(12) United States Patent
Bosco et al.

(10) Patent No.: US 7,734,110 B2
(45) Date of Patent: Jun. 8, 2010

(54) METHOD FOR FILTERING THE NOISE OF A DIGITAL IMAGE SEQUENCE

(75) Inventors: Angelo Bosco, Giarre (IT); Sebastiano Battiato, Aci Catena (IT)

(73) Assignee: STMicroelectronics S.r.l, Agrate Brianza (IT)

( * ) Notice: Subject to any disclaimer, the term of this patent is extended or adjusted under 35 U.S.C. 154(b) by 1757 days.

(21) Appl. No.: 10/648,776

(22) Filed: Aug. 12, 2003

(65) Prior Publication Data

US 2004/0119861 A1  Jun. 24, 2004

(30) Foreign Application Priority Data

Aug. 23, 2002 (EP) ................... 02425532

(51) Int. Cl.
 G06K 9/00 (2006.01)
 G06K 9/40 (2006.01)
 H04N 5/335 (2006.01)
 H04N 5/00 (2006.01)

(52) U.S. Cl. ............... 382/264; 382/275; 382/167; 348/272; 348/606

(58) Field of Classification Search ......... 382/160–167, 382/260–266, 275; 348/272, 273, 606
See application file for complete search history.

(56) References Cited

U.S. PATENT DOCUMENTS

| | | | | |
|---|---|---|---|---|
| 4,630,307 A * | 12/1986 | Cok | ............ | 382/165 |
| 4,896,207 A * | 1/1990 | Parulski | ............ | 348/242 |
| 5,065,444 A * | 11/1991 | Garber | ............ | 382/275 |
| 5,371,470 A * | 12/1994 | Jeng | ............ | 327/552 |
| 5,490,094 A * | 2/1996 | Heimburger et al. | ............ | 348/607 |
| 5,751,861 A * | 5/1998 | Astle | ............ | 382/250 |
| 5,883,987 A * | 3/1999 | Ogoshi et al. | ............ | 382/312 |
| 6,091,851 A * | 7/2000 | Acharya | ............ | 382/167 |
| 6,132,724 A * | 10/2000 | Blum | ............ | 424/725 |
| 6,229,578 B1 | 5/2001 | Acharya et al. | ............ | 348/607 |
| 6,240,208 B1 * | 5/2001 | Garakani et al. | ............ | 382/190 |
| 6,483,928 B1 * | 11/2002 | Bagni et al. | ............ | 382/107 |
| 6,496,605 B1 * | 12/2002 | Osa | ............ | 382/268 |
| 6,642,963 B1 * | 11/2003 | Assadi | ............ | 348/273 |
| 6,788,823 B2 * | 9/2004 | Allred et al. | ............ | 382/260 |
| 6,873,442 B1 * | 3/2005 | Gindele et al. | ............ | 358/471 |
| 6,898,331 B2 * | 5/2005 | Tiana | ............ | 382/274 |

(Continued)

FOREIGN PATENT DOCUMENTS

EP  1 100 260 A1  5/2001

OTHER PUBLICATIONS

Bosco et al. "A Temporal Noise Reduction Filter Based on Image Sensor full Frame Data", 2003 IEEE, pp. 402-403.*

(Continued)

*Primary Examiner*—Bhavesh M Mehta
*Assistant Examiner*—Mia M Thomas
(74) *Attorney, Agent, or Firm*—Lisa K. Jorgenson; Thomas J. Satagaj; Seed IP Law Group PLLC

(57) ABSTRACT

The present invention sets out to make available a method for reducing noise in an image sequence. This method can be implemented in an acquisition device such as a digital video camera or the like. The aim of this invention is attained with a method for filtering a sequence of digital images in CFA format.

20 Claims, 6 Drawing Sheets

U.S. PATENT DOCUMENTS

| | | | |
|---|---|---|---|
| 6,900,836 B2 * | 5/2005 | Hamilton, Jr. | 348/241 |
| 6,904,169 B2 * | 6/2005 | Kalevo et al. | 382/167 |
| 6,933,983 B2 * | 8/2005 | Wredenhagen et al. | 348/618 |
| 7,034,892 B2 * | 4/2006 | Ojo et al. | 348/607 |
| 7,035,462 B2 * | 4/2006 | White et al. | 382/167 |
| 7,162,099 B2 * | 1/2007 | Ojo et al. | 382/261 |
| 7,260,272 B2 * | 8/2007 | Lin et al. | 382/275 |
| 7,346,221 B2 * | 3/2008 | Chanas et al. | 382/255 |
| 7,352,896 B2 * | 4/2008 | Rantanen et al. | 382/167 |
| 7,352,909 B2 * | 4/2008 | Guleryuz | 382/254 |
| 7,366,242 B2 * | 4/2008 | Demos | 375/240.29 |
| 2001/0021276 A1 * | 9/2001 | Zhou | 382/266 |
| 2002/0094130 A1 * | 7/2002 | Bruls et al. | 382/261 |
| 2002/0164063 A1 * | 11/2002 | Heckman | 382/133 |
| 2003/0026498 A1 * | 2/2003 | Sirtori et al. | 382/278 |
| 2003/0048368 A1 | 3/2003 | Bosco et al. | |
| 2003/0095206 A1 * | 5/2003 | Wredenhagen et al. | 348/448 |
| 2003/0095717 A1 * | 5/2003 | Gindele et al. | 382/260 |
| 2004/0028289 A1 * | 2/2004 | Le Meur et al. | 382/275 |
| 2004/0119861 A1 * | 6/2004 | Bosco et al. | 348/272 |
| 2004/0264799 A1 * | 12/2004 | Gallagher et al. | 382/265 |
| 2005/0243205 A1 * | 11/2005 | Wredenhagen et al. | 348/448 |
| 2005/0248671 A1 * | 11/2005 | Schweng | 348/246 |
| 2005/0276510 A1 * | 12/2005 | Bosco et al. | 382/275 |

OTHER PUBLICATIONS

Google Scholar Search.*

Kliehorst et al. "An Adaptive Order Statistic Noise Filter for Gamma Corrected Image Sequences"; IEEE Transactions on Image Processing 1997, pp. 1-15.*

Color Filter Array-Definition—pp. 1-7.*

DuBois et al. Noise Reduction in Image Sequences Using Motion Compensated Temporal Filtering; IEEE Transactions on Commmunications, vol. Com 32, No. 7, Jul. 1984, pp. 1-7.*

Borghys et al. Noise Reduction in Image Sequences with Sparse Temporal Sampling; Royal Military Academy Electrical Engineering Department, pp. 1-4.*

Bosco, A. et al., "Adaptive Filtering for Image Denoising," in *Proceeding of the Int'l. Conference on Consumer Electronics, 2001 Digest of Technical Papers, ICCE*, Los Angeles, CA, New York, NY, Jun. 19, 2001, pp. 208-209.

Kalevo, O. et al., "Noise Reduction Techniques for Bayer-Matrix Images," in *Proceedings of the SPIE—The Int'l. Society for Optical Engineering*, San Jose, CA, Jan. 21-23, 2002, pp. 348-359.

Yan, L., "Noise Reduction for MPEG Type of Codec," in Proceedings of the Int'l. Conference on Acoustics, Speech and Signal Processing (ICASSP), New York, NY, Apr. 19-22, 1994, pp. 429-432.

Duncan, D.B., "Multiple Range and Multiple F Tests," Biometrics, vol. 11, pp. 1-42, 1955.

* cited by examiner

SM_G

| G | R | G₁ | R | G |
|---|---|---|---|---|
| B | G₂ | B | G₃ | B |
| G₄ | R | G₀ | R | G₅ |
| B | G₆ | B | G₇ | B |
| G | R | G₈ | R | G |

| R₁ | G | R₂ | G | R₃ |
|---|---|---|---|---|
| G | B | G | B | G |
| R₄ | G | R₀ | G | R₅ |
| G | B | G | B | G |
| R₆ | G | R₇ | G | R₈ |

SM_B

| B₁ | G | B₂ | G | B₃ |
|---|---|---|---|---|
| G | R | G | R | G |
| B₄ | G | B₀ | G | B₅ |
| G | R | G | R | G |
| B₆ | G | B₇ | G | B₈ |

*Fig. 5*

METHOD FOR FILTERING THE NOISE OF A DIGITAL IMAGE SEQUENCE

BACKGROUND OF THE INVENTION

1. Field of the Invention

The present invention concerns the processing of digital images and, more particularly, a method for filtering noise in a digital image sequence.

2. Description of the Related Art

Digital images are currently being used in numerous applications, including those related with such traditional acquisition devices as still and video cameras. It is to be expected that ever greater use of digital images will be made in such new generation devices as mobile multimedia communication terminals.

There exist numerous devices or applications that use digital images in sequence, that is to say, images acquired one after the other, separated by a brief interval of time and representing approximately the same real scene.

The speed with which the sequence is acquired, i.e., the number of images acquired in a given time interval, may vary according to the specific application; for example, this number is very large in digital video cameras (about 25 images per second) and smaller (about 15 images per second) in mobile communication terminals, which acquire the digital images and then transmit them in real time to a remote terminal.

It is well known that digital image acquisition devices, especially when they include CMOS sensors, will intrinsically introduce noise into the acquired images.

In digital image sequences noise not only degrades the quality of the images, but also reduces the encoding/compression efficiency. Indeed, the acquired image sequences have commonly to be encoded/compressed by means of encoding/compression techniques that operate in accordance with, for example, the MPEG standard or the H263 standard and nowadays are very widely used in the greater part of devices in the market today.

The encoding/compression efficiency becomes reduced by the presence of noise, because the introduced noise is typically in the form of random fluctuations that reduce redundancy both within an image and between images that are temporally close to each other.

There exist numerous filtering techniques intended to reduce or eliminate the noise present in an image sequence.

Numerous attempts have been made to develop efficient techniques for reducing the noise of a sequence by using various specific types of filters. Known digital filters include, for example, low-pass filters, median filters, adaptive spatial filters and recursive temporal filters with or without motion compensation.

Other prior art techniques seek to improve noise reduction efficiency in image sequences by having recourse to hybrid methods that combine digital spatial filtering with digital temporal filtering.

Though the known techniques for reducing noise in image sequences are satisfactory in many respects, they are also associated with numerous drawbacks and problems that are bound up with, for example, inadequate performance, processing complexity and excessive processing costs that make it difficult to employ them in portable acquisition devices of a commercial type.

BRIEF SUMMARY OF THE INVENTION

The present invention therefore sets out to make available a method for reducing noise in an image sequence. This aim is attained with a method for filtering a sequence of digital images in CFA format as described in claims 1 to 12 attached hereto.

Another object of the present invention is to provide a filter as described in claim 13 and an acquisition device as described in claim 14.

BRIEF DESCRIPTION OF THE SEVERAL VIEWS OF THE DRAWINGS

Further characteristics of the invention and the advantages associated therewith will be more readily understood from the detailed description about to be given of a preferred embodiment thereof, which is to be considered as an example and not limitative in any way, said description making reference to the attached drawings of which:

FIG. 4 shows a selection mask for selecting green-colored pixels that can be employed in the method in accordance with the present invention;

FIG. 5 shows two selection masks for selecting red-colored pixels and blue-colored pixels that can be employed in the method in accordance with the present invention;

DETAILED DESCRIPTION OF THE INVENTION

The preferred embodiment example of the present invention relates to a portable device capable of acquiring digital image sequences for video applications and, more particularly, concerns the noise filtering of an image sequence acquired with a digital video camera.

In this connection it should be noted that the teachings of the present invention can be extended also to applications other than those to which explicit reference is made in the description about to be given, for example, to the acquisition of image sequences in mobile multimedia communication terminals of the new generation.

Figure 1:
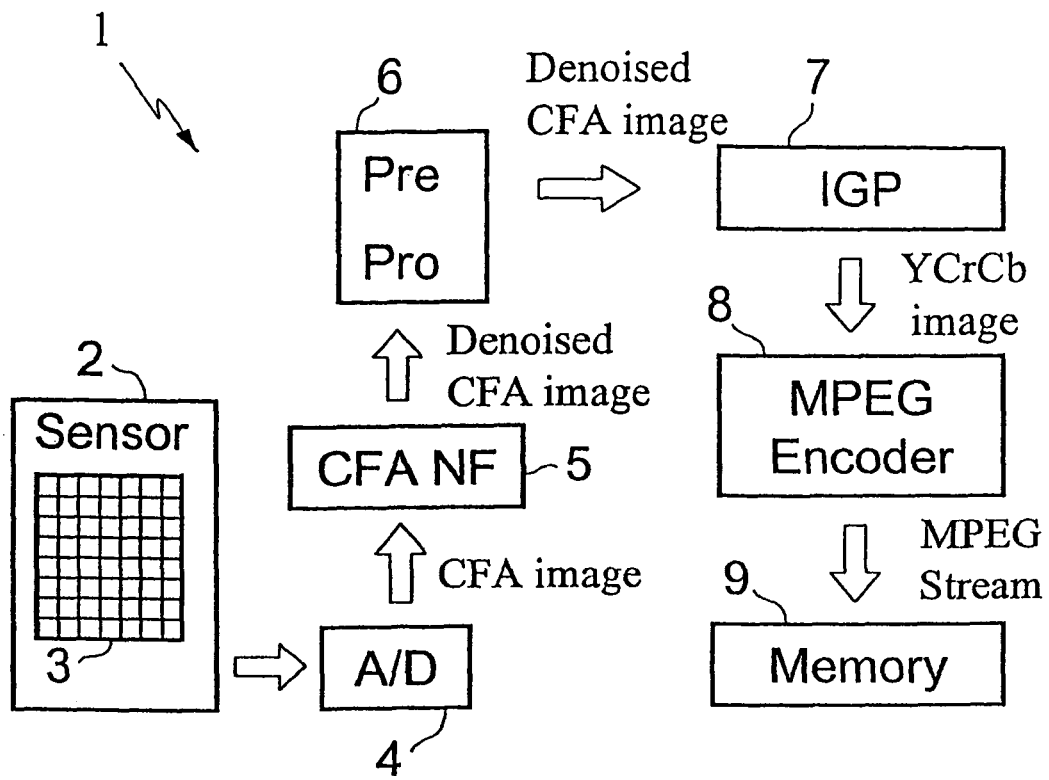
FIG. 1 shows the block diagram illustrating a possible acquisition device that implements a method in accordance with the present invention.

FIG. 1 provides a very schematic illustration of a digital video camera 1 in the form of function blocks. The video camera 1 includes an acquisition block 2 that comprises an optical sensor 3.

The optical sensor 3, which may be—for example—of the CCD (Charge Coupled Device) or the CMOS (Complementary Metal Oxide Semiconductor) type, is an integrated circuit comprising a matrix of photosensitive cells, each of which serves to generate an electrical signal proportional to the quantity of light that strikes it during the acquisition interval. Each photosensitive cell of the sensor, which is commonly referred to by the term pixel, corresponds to a respective pixel of the digital image.

In a preferred embodiment the sensor 3 comprises an optical CFA (Color Filter Array) filter, for example, with a Bayer-type matrix.

Figure 2:
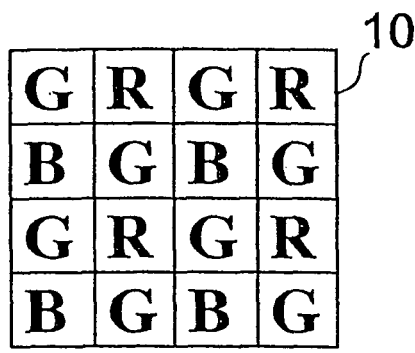
FIG. 2 shows the pattern of the filtering elements of a Bayer sensor that can be used in the device of FIG. 1.

As is well known to persons skilled in the art, in a sensor with a CFA filter only a single photosensitive cell is available for acquiring a pixel. The sensor is covered by an optical filter constituted by a matrix (a Bayer matrix, for example) of filtering elements, each of which is associated with a photosensitive cell. Each filtering element transmits to the photosensitive cell associated with it the light radiation corresponding to the wavelength of only red light, only green light or only blue light, so that for each pixel it detects only one component (of which it absorbs no more than a minimal part). The pattern of the filtering elements in a Bayer filter is shown in FIG. 2, where the letters R,G,B indicate, respectively, the red, green and blue elements.

The video camera 1 also includes an analog/digital (A/D) conversion block, indicated by the reference number 4, to translate the generated electric signal into a digital value with a predetermined number of bits (generally 8, 10 or 12 bits). One may assume, solely by way of example and without thereby introducing any limitation whatsoever, that in the present invention the A/D converter 4 is such as to encode the incoming analog signals with eight-bit digital values.

On the output side of the A/D block 4 the digital image is in a video format, for example, it may be in a CFA (Color Filter Array) format, since each pixel is constituted by just a single chromatic component (R, G or B). For this reason, a single one-byte digital value is associated with each pixel. In one embodiment, the digital image may be in the CFA format, but in other embodiments, other formats may be used and these are included within the concept of the invention. Thus, the reference to CFA herein should be understood to be one example of how to carry out the invention.

A filtering block 5—in this example of the Bayer type—is such as to filter the noise by operating directly on the digital CFA images of the sequence, producing for each noisy CFA image on its input side a CFA image with reduced noise on its output side.

A pre-processing (PrePro) block 6, active before and during the entire acquisition phase, is such as to interact with the acquisition block 2 and to extract from the CFA image a number of parameters useful for carrying out automatic control functions: self-focusing, automatic exposure, correction of sensor defects and white balancing.

A block 7, the IGP (Image Generation Pipeline) block, is designed to perform a processing phase that, starting from the digital CFA image, will produce a complete digital image—YCrCb format, for example—in which each pixel will have associated with it three digital values (i.e., a total of 24 bits) corresponding to a luminance component Y and two chrominance components Cr and Cb. This transformation, known by the name of color interpolation, involves a passage from a representation of the image in a single plane (Bayer plane), which nevertheless contains information relating to different chromatic components, to a representation in three planes.

In digital still cameras the IGP block is commonly realized in the form of a dedicated processor. In one embodiment, this is a CFA processor, which may be implemented in VLSI (Very Large Scale Integration) technology.

Preferably, the IGP block 7 in this example is also such as to perform, over and above the interpolation, various other functions, including—for example—the application of special effects, gamma correction, scaling, stabilization and other functions that will generally vary from one producer to another.

This is followed by a compression/encoding block 8, which in this example is of the MPEG type (but could also be of other types, H263 for example), and a memory unit 9.

When shooting a video sequence with the video camera 1, the sequence images are acquired consecutively by means of the acquisition block 2, preferably separated only by a brief time interval between one image and the next. The MPEG-4 standard, for example, requires fifteen images to be acquired per second.

Hereinafter we shall use $Img_1$, $Img_2$, $Img_3$, ..., $Img_{n-1}$, $Img_n$, $Img_{n+1}$, ... to indicate the images acquired in sequence: $Img_1$ represents the first image of the sequence to be acquired, $Img_2$ represents the second image, and so on.

Following acquisition, each image is processed by the subsequent blocks, so that in all the subsequent processing phases the images will still be processed in the temporal order in which they were acquired.

Once they have been acquired, the sequence images are converted into digital values by the A/D converter 4.

The CFA format digital images are then sent as input to the noise filter block 5 (CFA NF) to be processed in accordance with the noise filtering method of the present invention. As output the filter block produces a sequence of filtered CFA images, respectively, $f\_Img_1$, $f\_Img_2$, $f\_Img_3$, ..., $f\_Img_{n-1}$, $f\_Img_n$, $f\_Img_{n+1}$, each of which has less noise than on the input side.

The filtered CFA images are then processed by the pre-processing block 6.

On leaving the pre-processing block 6, each CFA image is sent to the IGP block 7. In this block the images are subjected to a color interpolation phase and therefore transformed into complete images, for example, in YCrCb format.

The color interpolation phase may be performed, among others, by means of methods that are known to a person skilled in the art and are therefore obvious from the previous description.

Thereafter the images are sent to the MPEG encoder block 8, which produces as its output a sequence or stream of images encoded/compressed in accordance with an MPEG encoding.

The MPEG stream of compressed images may be recorded in a memory unit 9 or sent to an external peripheral device not shown in the figure.

In a preferred embodiment the processing method filters the sequence of CFA images one at a time, in this example by means of a Bayer filter.

The CFA images are filtered pixel by pixel, the scanning order being such that the pixels are systematically scanned from left to right and from top to bottom. In particular, for each pixel $p_n(x,y)$ of an image $Img_n$ there is calculated a respective filtered homologous pixel $f\_p_n(x,y)$ of a corresponding filtered image $f\_Img_n$.

When processing the pixel $p_n(x,y)$ of the image $Img_n$ and calculating the filtered pixel $f\_p_n(x,y)$, the method of the present invention makes advantageous use also of the filtered pixels forming part of an image $f\_Img_{n-1}$ of the previously filtered sequence. More particularly, it utilizes the image $f\_Img_{n-1}$ obtained by filtering the image $Img_{n-1}$ that in the sequence temporally precedes the image to be filtered $Img_n$.

Typically, therefore, three image buffers will be sufficient for carrying out the filtering process: two input buffers that contain, respectively, the image $Img_n$ to be filtered (current image) and the previously filtered image $f\_Img_{n-1}$, as well as an output buffer containing the filtered current image $f\_Img_n$.

Figure 3:
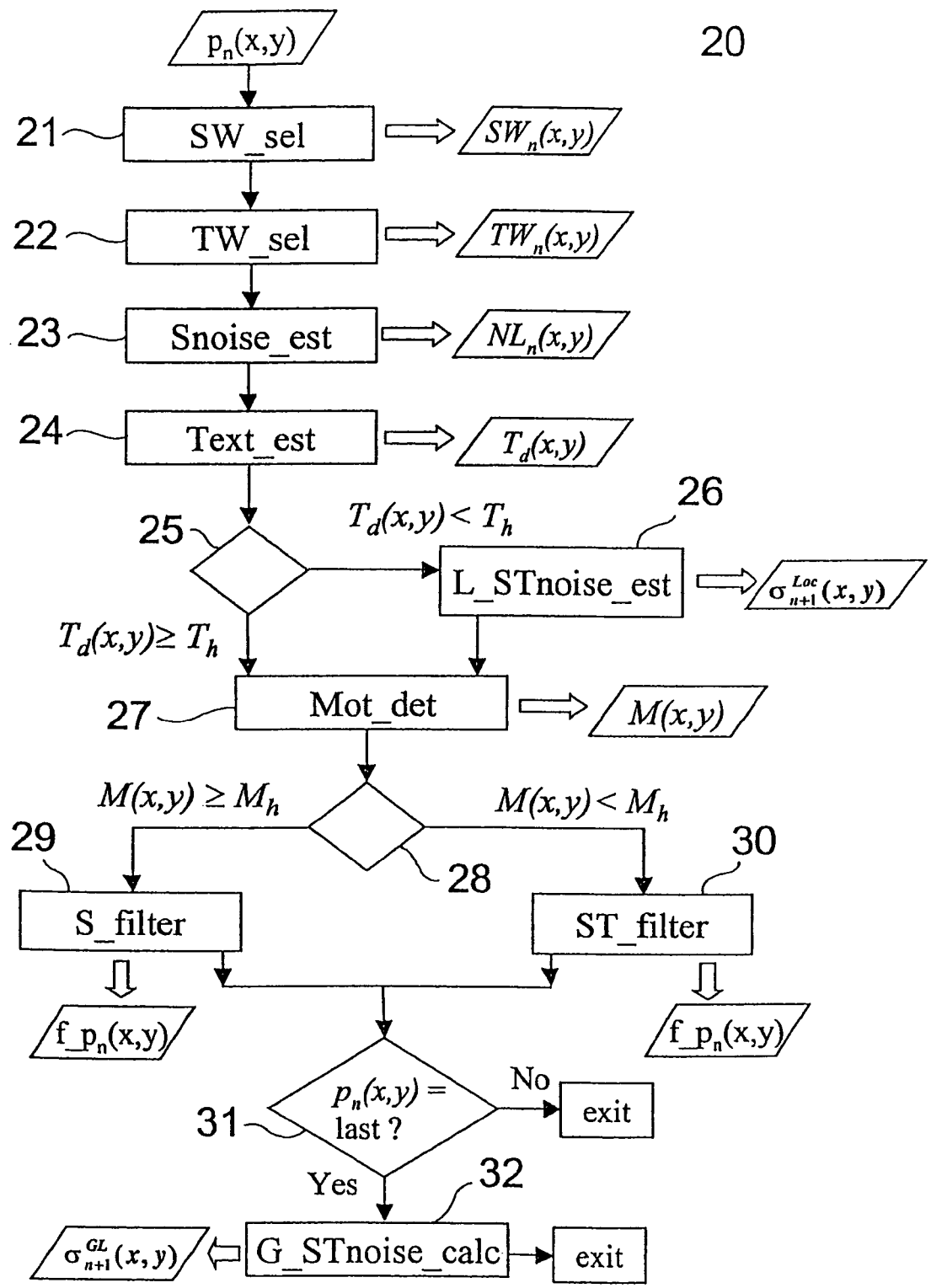
FIG. 3 schematically illustrates the succession of phases of a method in accordance with the present invention.

FIG. 3 shows a schematic representation of the succession of phases of a processing method 20 for reducing noise in accordance with the present invention.

In particular, FIG. 3 shows the phases by means of which, starting from the pixel $p_n(x,y)$ of the image $Img_n$, there is obtained the respective homologous filtered pixel $f\_p_n(x,y)$ of the corresponding filtered image $f\_Img_n$.

Given the input pixel $p_n(x,y)$ to be filtered, a first selection phase 21 (SW_sel) selects a first pixel set $SW_n(x,y)$ comprising the said pixel $p_n(x,y)$ and a plurality of pixels forming part of the image $Img_n$ in the neighborhood of said pixel. In one embodiment, the phase selects adjacent pixels that have associated with them the same color (R, G or B) as the pixel to be filtered.

In a preferred embodiment, the selection is performed by using selection masks (or matrices) SM_G, SM_R, SM_B that differ on the basis of the color of the pixel $p_n(x,y)$ to be filtered, but all of dimension 5×5, for example, like those shown in FIGS. 4 and 5.

FIG. 4 shows a selection mask SM_G for the green pixels (G) in accordance with a particular embodiment of the invention. In the selection phase 21 the mask SM_G is aligned with the image to be filtered in such a way that that $G_0$ corresponds to the green pixel $p_n(x,y)$ to be filtered. In this way the mask SM_G will select a first set of pixels $SW_n(x,y)$ comprising the green pixel $p_n(x,y)$ corresponding to $G_0$ and eight adjacent pixels situated, respectively, in positions corresponding to the pixels $G_1, \ldots, G_8$ of the mask SM_G shown in the figure. This set defines a spatial working window $SW_n(x,y)$ for the green pixel to be filtered.

Analogously, FIG. 5 shows the selection masks SM_R and SM_B to be used, respectively, when the pixels to be filtered are red or blue.

The mask SM_R for the red pixels is such as to select a first set of pixels $SW_n(x,y)$ comprising the red pixel $p_n(x,y)$ to be filtered corresponding to $R_0$ and eight adjacent red pixels situated, respectively, in positions corresponding to the pixels $R_1, \ldots, R_8$ of the mask.

It should be noted that in this particular embodiment the selection mask SM_B for the blue pixels is identical with the selection mask SM_R for the red pixels. This choice is possible thanks to the particular pattern in which the filtering elements are arranged in a Bayer-type sensor.

This brings with it the advantage that the selection phase 21 (SW_sel) has to discriminate only between two possible cases, namely to distinguish whether the pixel $p_n(x,y)$ to be filtered is or is not green.

Coming back to FIG. 3, a second selection phase 22 (TW_sel) selects a second set of pixels $TW_n(x,y)$, comprising pixels forming part of the previously filtered image $f\_Img_{n-1}$ and arranged in corresponding positions, i.e., homologous with the pixels of the first $TW_n(x,y)$.

To this end it will be advantageous to use the selection matrices described above, but this time applied to the previously filtered image $f\_Img_{n-1}$.

The pixel set obtained in this manner defines a temporal working window $TW_n(x,y)$ for the pixel to be filtered.

The temporal and spatial working windows represent the set of pixels that will play a part in the subsequent phases of the filtering process of the pixel $p_n(x,y)$.

As is well known to a person skilled in the art, when digital image sequences are filtered, a filtered pixel can be obtained by appropriately combining a certain number of pixels that are adjacent to it either in space (spatial filtering), in time (temporal filtering) or in space/time (spatio-temporal filtering).

In particular, as will be described in greater detail later on, the method of the present invention decides pixel by pixel whether the filtering to be used is to be exclusively spatial or, on the other hand, spatio-temporal. Advantageously, the decision regarding the type of filtering to be employed will be bound up with the amount of motion between successive images of the sequence, since this will make it possible to avoid motion compensation, a computationally very costly operation.

When spatial filtering is employed, the operation will involve only the pixels of the spatial working window $SW_n(x,y)$, otherwise use will be made of the pixels forming part of both the windows.

Once the two working windows—respectively in space and time—have been obtained, a first noise estimation phase 23 (Snoise_est) has as its first step the making of an estimate of a statistical parameter $NL_n(x,y)$ representative of the noise level present on the pixel $p_n(x,y)$ and the respective spatial working window $SW_n(x,y)$. Henceforth we shall refer to this noise as spatial noise, while the phase will be referred to as spatial noise estimation.

In greater detail, the first step of the estimating phase 23 (Snoise_est) is to make a preliminary noise estimate (i.e., to estimate a statistical parameter representative of the noise level) by means of a local calculation, that is to say, calculated for the pixels of the spatial working window $SW_n(x,y)$. As second step it obtains the definitive spatial estimate $NL_n(x,y)$ by modifying the preliminary estimate on the basis of a spatial estimate of the noise specific for the color of the pixel to be filtered and specific also for the image $Img_n$.

In greater detail, again, the spatial noise estimate is obtained by means of a computation of the recursive type that is made by taking into account not only a preliminary and local noise calculation, but also the spatial estimate of the noise level made for the last filtered pixel of the image $Img_n$ having the same color as the pixel to be filtered $p_n(x,y)$.

Stated in mathematical terms, in the case in which, for example, $p_n(x,y)$ is a green pixel, we have:

$$NL_n(x,y) = NL_n^G(x,y) = k_n(x,y) \times N[SW_n(x,y)] + (1 - k_n(x,y)) \times NL_n^G(pp^G) \quad (1)$$

where the superscript "G" indicates that the term relates to the color green, $N[SW_n(x,y)]$ is the preliminary estimate calculated for the spatial working window $SW_n(x,y)$, $k_n(x,y)$ is a multiplication factor comprised between zero and one and determines the strength of the spatial filter, $NL_n^G(pp^G)$ is the spatial noise estimate made for the green pixel $pp^G$ of the image $Img_n$ that immediately precedes the green pixel to be filtered $p_n(x,y)$ in the order in which the image $Img_n$ is scanned.

Obviously, if the pixel to be filtered $p_n(x,y)$ is the first pixel of the respective color to be filtered in the image $Img_n$, only the preliminary estimate $N[SW_n(x,y)]$ will be available. In that case we can either put, for example, $k_n(x,y) = 1$ solely for the pixel $p_n(x,y)$ or, alternatively, assign an arbitrary and preferably small value to the quantity $NL_n^G(pp^G)$.

The first phase of the spatial noise estimation 23 (Snoise_est) may be carried out, for example, as described in detail in European Patent Application No. 01830562.3 filed in the name of the present applicant, which is to be deemed to be wholly incorporated herein by reference. The meaning of the quantities $NL_n(x,y)$, $N[SW_n(x,y)]$, $k_n(x,y)$, $NL_n^G(pp^G)$ and the manner in which they are calculated are likewise explained in that document. In this connection please refer to formulas (1), (2), (3), (4), (5), (6), (7), (8) and FIGS. 7, 8A, 8B, 10 (and the descriptions relating thereto) of the aforesaid patent application No. 01830562.3. For further details of the spatial noise estimation as described hereinabove, especially as expressed in equation (1), reference should also be made to U.S. Pat. No. 6,108,455.

The spatial noise estimate $NL_n(x,y)$ as calculated in this manner is used for regulating the degree or strength of the filtering in the case in which the filtering of the pixel $p_n(x,y)$ is exclusively of the spatial type.

Once the spatial noise estimation phase of Snoise_est 23 has been completed, a subsequent inhomogeneity estimation phase Text_est associates an inhomogeneity index (or "texture" degree) $T_D(x,y)$ with the pixel to be filtered $p_n(x,y)$ on the basis of a measure of the inhomogeneity (or, analogously, of the homogeneity) of the pixels forming part of the spatial working window $SW_n(x,y)$.

The inhomogeneity index $T_D(x,y)$ serves to decide whether the pixel $p_n(x,y)$ does or does not form part of a homogeneous region, this with a view to establishing whether or not the pixel in question (and therefore the corresponding spatial working window) will have to contribute to a spatio-temporal noise estimate to be described in greater detail further on.

In fact, a homogeneous region can provide reliable information about the effective noise present in the image, because the fluctuations (i.e., the differences) between pixels forming part of a homogeneous region are substantially to be attributed to random noise.

Persons skilled in the art are familiar with different metrics for calculating an inhomogeneity measure associated with a set of pixels, and for this reason we shall not here delve further into this matter. Among these metrics we shall here cite the following solely by way of example: maximum difference, minimum difference, MAD (Mean of the Absolute Differences), standard deviation, extraction of a distribution parameter from a histogram of the digital values of the pixels.

In an embodiment that is particularly advantageous from a computational point of view, the parameter $k_n(x,y)$ used in the spatial noise estimation phase 23 (Snoise_est) is calculated on the basis of an inhomogeneity/homogeneity measure. More particularly, it is obtained on the basis of a calculation of the differences between the pixel to be filtered and the other pixels of the spatial working window. In that case the inhomogeneity estimation phase 24 (Text_est) can be inserted in the spatial noise estimation phase 23 (Snoise_est) by calculating a single inhomogeneity measure that can be used both for estimating the spatial noise and for associating an inhomogeneity index $T_D(x,y)$ with the pixel to be filtered.

A comparison phase 25 is used to verify whether the inhomogeneity index $T_D(x,y)$ of the pixel $p_n(x,y)$ is smaller than a predetermined threshold value $T_h$ (i.e., whether the pixel forms part of a region deemed to be homogeneous). Namely, when the inhomogeneity index $T_D$ is smaller than a threshold $T_h$, there is a local noise estimation phase 26 before the motion detection phase 27, but if $T_D$ is larger than $T_h$, there is a motion detection phase 27 immediately after the comparison phase.

If this is not the case, the next step is the motion detection phase 27 (Mot_det). But if the pixel forms part of homogeneous region, the motion detection phase 27 is preceded by a second local noise estimation phase 26 (L_STnoise_est), i.e., performed on the pixel to be filtered, that serves to obtain a global noise estimate (i.e., for the entire image that is being processed).

The local noise estimation phase 26 (L_STnoise_est) estimates a parameter—which may be statistical, for example—representative of the noise locally present in the spatial working window. This parameter is calculated, for example, as a local standard deviation $\sigma_{n-1}^{Loc}$ of the spatial working window of the pixel $p_n(x,y)$ or as some other analogous energy measure.

Given the spatial working window $SW_n(x,y)$ of the pixel $p_n(x,y)$, the local standard deviation $\sigma_{n-1}^{Loc}$ can be calculated in accordance with the following formula:

$$\sigma_{n+1}^{Loc}(x,y) = \sqrt{\frac{1}{N-1} \sum_{(x,y) \in SW_n(x,y)} (p_n(x,y) - m)^2} \qquad (2)$$

where N is the number of pixels forming part of the spatial working window $SW_n(x,y)$ (in this case N=9) and m is the mean of the digital values of these pixels.

As already mentioned (and as is to be explained in greater detail further on), once the filtering of the image $Img_n$ has been terminated, the various local standard deviations $\sigma_{n-1}^{Loc}$ calculated in this manner for the pixels of the image $Img_n$ that are deemed to form part of homogeneous regions will be used for updating a global noise estimate $\sigma_{n+1}^{GL}$, which we shall hereinafter refer to also as spatio-temporal noise estimate. In particular, this global estimate will be used for the spatio-temporal filtering of the subsequent image $Img_{n+1}$.

The movement detection phase 27 (Mot_det) compares the pixels of the temporal working window $TW_n(x,y)$ with the pixels of the spatial working window $SW_n(x,y)$ in order to ascertain the presence of motion between the two working windows and possibly evaluate its magnitude.

As is well known to a person skilled in the art, when using a "non-compensated motion" approach, appropriate precautions have to be taken to avoid the introduction during the spatio/temporal filtering of artifacts due to the motion between consecutive images. In particular, care must be taken to assure that the two working windows will not contain incongruent data on account of the motion between consecutive images or parts of them.

For example, it may happen that one working window contains pixels that form part of an object, while the other window contains pixels that form part of the background, because the object has moved between one image and the next.

Typical examples of artifacts that could be produced in these cases are the presence of troublesome trails and so-called "ghost images" that become visible in the filtered image due to residual information of previous images.

In a preferred embodiment, the motion detection phase (Mot_det) calculates as measure of motion a measure $M(x,y)$ that is the sum of the absolute differences (SAD) between the pixels of the temporal working window and the pixels of the spatial working window. The greater the differences between the two windows, the greater will be the value of this measure $M(x,y)$, which can therefore be representative of the motion between the two windows.

The standard SAD measure as an isolated item is well known to persons skilled in the art and thus need not be described in detail herein.

In a particularly advantageous embodiment variant when used with the present invention, the motion measure $M(x,y)$ is a "modified" SAD. This measure is calculated by determining the difference in absolute value between the two working windows pixel by pixel, thus obtaining a working window difference $DW_n(x,y)$ given by:

$$DW_n(x,y) = |SW_n(x,y) - TW_n(x,y)| \qquad (3)$$

Subsequently one proceeds to calculate the mean $W_{avg}$ of the pixels of the operating window difference $DW_n(x,y)$, thus obtaining the modified SAD measure $M(x,y)$, which is given by:

$$M(x,y)=SAD(DW_n(x,y)-W_{avg}).$$

The modified SAD measure obtained in this manner is advantageous, because it makes it possible to avoid a change in lighting conditions being erroneously interpreted as a motion.

With a view to avoiding an excessive sensitivity of the SAD value to the digital values of the pixels of the two working windows (which are contaminated by noise), another particularly advantageous embodiment variant makes it possible to introduce a slight quantization of the pixel values by reducing the accuracy of the pixel values from eight to seven bits when calculating the SAD.

Another comparison phase 28 then checks whether the motion measure $M(x,y)$ of the pixel $p_n(x,y)$ is greater than a predetermined threshold value $M_h$.

When this is the case, the system concludes that there is excessive change between the two working windows and the subsequent filtering phase 29 (S_filter) is therefore exclusively of the spatial type.

The exclusively spatial filtering produces the filtered pixel $f\_p_n(x,y)$ from the pixels of the spatial working window. The strength of the filtering is regulated by the estimate of the spatial noise level $NL_n(x,y)$ calculated in noise estimation phase 23 (Snoise_est). In a preferred embodiment, the spatial digital filtering is carried out in accordance with the technique described in the previously mentioned European Patent Application No. 01830562.3, which obtains the filtered pixel as a weighted average (mean) of the pixels of the spatial working window (see, in particular, formula (9) of said application).

Obviously, the exclusively spatial filtering is also carried out for all the pixels of the first image of the sequence, because temporal data are not yet available in this case.

Figure 6:
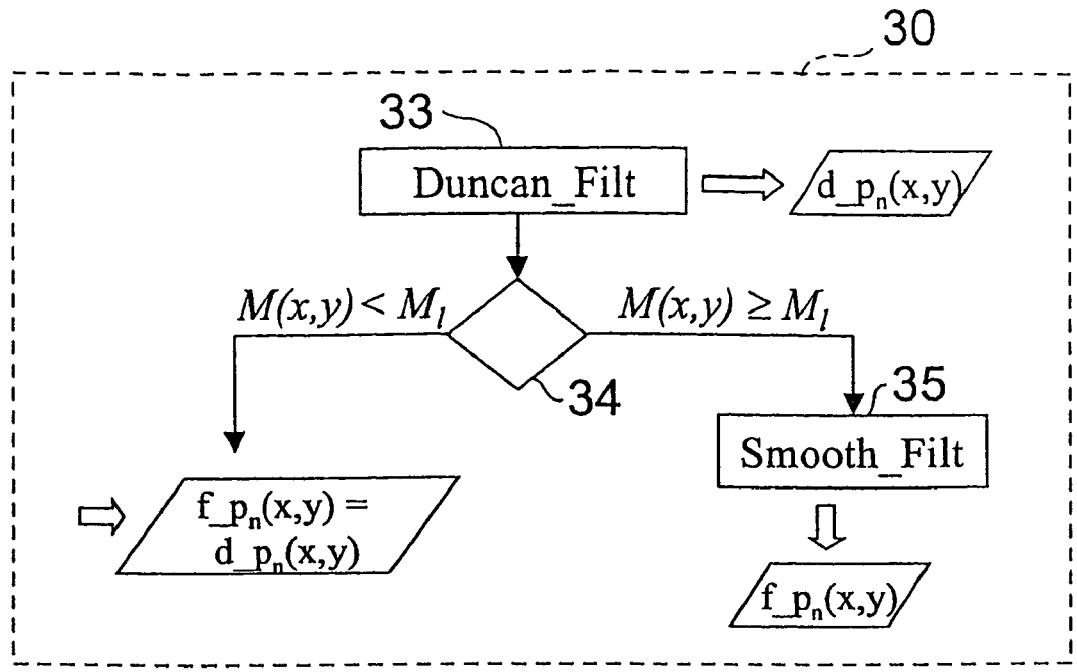
FIG. 6 shows one of the phases of the succession illustrated by FIG. 3 in greater detail.

On the other hand, when the motion measure $M(x,y)$ is smaller than the predetermined threshold value $M_h$, the subsequent filtering phase 30 (ST_filter) is of the spatio/temporal type and is illustrated in greater detail in FIG. 6.

ST_filter 30 consists of a first filtering phase 33 (Duncan_Filt), which produces a provisional filtered pixel $d\_p_n(x,y)$ in accordance with a filtering technique that is known by the name of Duncan filtering and will be described in greater detail further on. In this phase the provisional filtered pixel $d\_p_n(x,y)$ is obtained from a subset of pixels forming part of both the working windows.

As can be seen in FIG. 6, when the detected motion is deemed to be sufficiently small, i.e., smaller than a further predetermined threshold value $M_l$ that is smaller than the threshold value $M_h$, the provisional filtered pixel is not subjected to any further processing and one simply puts:

$$f\_p_n(x,y)=d\_p_n(x,y) \quad (4)$$

In this case, therefore, the pixel $p_n(x,y)$ is effectively filtered by means of a Duncan spatio/temporal filtering method.

Vice versa, i.e., in the case in which the detected motion is not negligible, the provisional pixel $d\_p_n(x,y)$ is subjected to a further processing phase 35 (Smooth_Filt), which produces the "definitive" filtered pixel $f\_p(x,y)$ in accordance with a smoothing operation as defined by the following formula:

$$f\_p_n(x,y)=\beta_n \times d\_p_n(x,y)+(1-\beta_n) \times p_n(x,y) \quad (5)$$

where $\beta_n$ is a multiplying factor comprised between 0 and 1 that may either depend on the motion measure $M(x,y)$ or may be the same for all the images of the sequence. In a preferred embodiment, for example, $\beta_n$ is equal to about 0.75.

Following the smoothing operation, the definitive filtered pixel is obtained from a portion (in this example 75%) of the value provided by the Duncan filtering and a portion (25%) of the value of the unfiltered pixel. In other words, the definitive filtered pixel is obtained from the sum of a fraction of the provisional filtered pixel and a fraction of the unfiltered pixel.

This is done because, whenever there are non-negligible incongruencies due to motion between the working windows, it is important that one should be able to "neglect" the temporal information to a somewhat greater extent and attribute a little more importance to the current image that is being filtered.

We shall now describe a particularly advantageous embodiment of the Duncan filtering phase.

Duncan filtering first selects a subset or "range" of pixels forming part of the two working windows by means of the so-called "Duncan Range Test" or "DRT" (in this connection see "Multiple range and multiple f-tests", D. B. Duncan, Biometrics, vol. 11., pp. 1-42, 1955).

The application the DRT to digital filtering is known, for example, from European Patent Application EP 1 100 260 A1 by the present applicant.

The subsequent filtering operations of the pixel $p_n(x,y)$ are then performed only on the pixels that form part of the range selected by means of the DRT.

The purpose of the selection effected by means of the DRT is to exclude any pixels that, though forming part of the working windows, have had their value corrupted to an excessive extent by noise.

For example, such pixels may be present due to the effect of a particular noise—known as "salt and pepper noise"—capable of bringing the digital values of some pixels up to the maximum value or down to the minimum value of the scale of the possible digital values.

Selection by means of the DRT is also intended to exclude any pixels that are very different from the pixel to be filtered $p_n(x,y)$, for example, on account of a different information content. One may think, for example, of the case in which the pixel to be filtered $p_n(x,y)$ forms part of an "edge", while the working windows contain pixels that form part of the background of the scene. If the background pixels were not excluded, the image would suffer a considerable loss of definition as a result of the filtering.

A selection made by means of the DRT has to identify a digital value interval SI (selection interval) having an appropriate width S such as to contain the largest possible number of pixels (in this case forming part of the working windows) similar to the pixel to be filtered $p_n(x,y)$. The width S of the selection interval SI is correlated with the standard deviation of the noise to be filtered, which is assumed to be known.

It is not necessary for this interval to be centered around the pixel to be filtered: if this were to be the case and if the pixel to be filtered were, for example, highly corrupted by noise, the test would exclude pixels useful for the filtering.

In a preferred embodiment, the noise standard deviation used for the DRT selection during the filtering of the pixel $p_n(x,y)$ of the image $Img_n$ is the global spatio/temporal noise estimate $\sigma_n^{GL}$ calculated in the filtering of the previous image $Img_{n-1}$. This choice is particularly advantageous from the point of view of computational resource optimization: in this way, in fact, one avoids having to carry out a complete scanning of the image $Img_n$ that is to be filtered (an operation that serves only to estimate the noise) prior to the filtering in the proper sense of the term.

The theory of DRT selection provides all the instruments needed for calculating the width S from the standard deviation of the noise and determining the optimal selection interval SI. The implementation of these instruments, however, is very costly in computational terms and cannot readily be conciliated with the stringent requirements imposed by real-time image processing.

Figure 7:
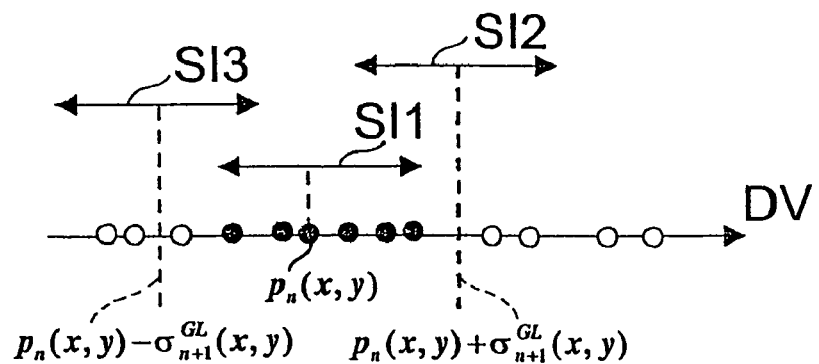
FIG. 7 shows an example of selecting pixels in accordance with a DRT selection.

In a preferred embodiment, an optimal compromise between reliability of the result and computational complexity is obtained by performing the selection of the pixel subset with one of the following three intervals SI1, SI2, SI3, as shown in FIG. 7, where:

the interval SI1 of width S is centered around the digital value DV of the pixel to be filtered $p_n(x,y)$;

the interval SI2 of width S is centered around the digital value $DV=p_n(x,y)+\sigma_n^{GL}$;

the interval SI3 of width S is centered around the digital value $DV=p_n(x,y)-\sigma_n^{GL}$.

The interval to be chosen from among these three intervals SI1, SI2, SI3 is the one that contains the largest number of pixels, which in FIG. 7 is the interval SI1. In this way good results are obtained even when the pixel to be filtered $p_n(x,y)$ is a very noisy pixel.

Still in a preferred embodiment, moreover, the width S of the selection interval SI is calculated as:

$$S = 3 \times \sigma_n^{GL}. \quad (6)$$

In a variant that is computationally costlier but yields optimized performances, the choice of the selection interval is made by using appropriate weighting functions in accordance with the method described in the aforementioned European Patent Application EP 1 100 260 A1 (where particular reference should be made to FIGS. 1b and 4).

Once the pixels $P_j$ most similar to the pixel to be filtered and contained in the two working windows and the selection interval SI have been identified by means of the DRT, the provisional filtered pixel $d\_p_n(x,y)$ is calculated as the weighted mean of these pixels or, put in mathematical terms:

$$d\_p_n(x, y) = \sum_{P_j \in SI} a_j P_j \quad (7)$$

where, preferably, the weighting coefficients $a_j$ are calculated as in the aforementioned European Patent Application EP 1 100 260 A1 (where particular reference should be made to page 6, lines 41-50).

Coming back to FIG. 3, the filtering—which, as previously explained, takes place in accordance with either phase 29 (S_filter) or phase 30 (ST_filter)—is followed by a control phase 31 that checks whether the pixel $p_n(x,y)$ that has just been filtered is the last pixel of the image $Img_n$. If $p_n(x,y)$ is not the last pixel, the method represented as a succession of phases in FIG. 3 is applied to the next pixel in the scanning order, for example, the pixel $p_n(x,y+1)$.

When it is the last pixel, on the other hand, there follows a global noise estimation phase of the spatio-temporal type based on the numerous local estimates $\sigma_{n+1}^{Loc}$ calculated for the pixels of the image $Img_n$ deemed to form part of homogeneous regions during the local noise estimation phase 26. In particular, these estimates are used to update a global noise estimate $\sigma_{n+1}^{GL}$ of the spatio-temporal type that will subsequently be used in the spatio-temporal filtering of the next image $Img_{n+1}$. Preferably, the global estimate $\sigma_{n+1}^{GL}$ should be representative of the standard deviation of the noise and be calculated as the mean of the numerous local estimates (standard deviations) $\sigma_{n+1}^{Loc}$.

In some situations it may however happen that adjacent images have excessively discordant values of the global standard deviation $\sigma_{n+1}^{GL}$ and the spatio-temporal filtering could therefore filter adjacent images with intensities that are too widely different. This would give rise to a bothersome flickering in the reproduction of the sequence.

With a view to avoiding this drawback, a preferred embodiment modifies the global standard deviation $\sigma_{n+1}^{GL}$, originally calculated as the mean of the local standard deviations, by obtaining a time average in a recursive manner of a certain number (for example: two) of global standard deviations $\sigma^{GL}$ relating to consecutive images. Put in mathematical terms, we thus have:

$$\sigma_{n+1}^{GL} = \gamma \times \sigma_{n+1}^{GL} + (1-\gamma) \times \sigma_n^{GL} \quad (8)$$

where y is a number comprised between 0 and 1, $\sigma_n^{GL}$ is the global noise estimate as updated during the filtering of the previous image $Img_{n-1}$ and used in the spatio-temporal filtering of the current image $Img_n$. For example, the number y may be equal to about 0.75.

We shall now describe some embodiments alternative to the particular method described hereinabove by reference to FIG. 3.

As compared with FIG. 3, the motion detection block 27 (Mot_det) of one of these embodiment variants limits itself to detecting the presence/absence of motion and as output provides a binary measure $M(x,y)$ indicative of the presence/absence of motion. For example, the output may be $M(x,y)=1$ when the presence of motion is detected, otherwise the output will be $M(x,y)=0$. In this case the value of the threshold $M_h$ may be chosen, for example, as equal to 0.5.

Phase 24 (Mot_det) may detect the presence of motion by means of a "trail detection" method that operates by simply calculating the differences the two working windows pixel by pixel. If these differences all have the same sign, be it positive or negative, the system detects the presence of motion, otherwise it detects the absence of motion.

When the presence of motion is detected, the next step is the previously described spatial filtering phase 29.

In the contrary case, i.e., when no motion is detected, this is followed by a spatio-temporal filtering phase 30 (ST_filter) in which the filtered pixel is obtained by means of a Duncan filtering phase 33 (Duncan_Filt)—see FIG. 6—that may or may not be followed by a phase of smoothing filtering 35 (Smooth_Filt).

In yet another embodiment variant, the two filtering phases 29 and 30 (S_filter and ST_filter), which are, respectively, a spatial filtering and a spatio-temporal filtering, obtain the weighted means for calculating the filtered pixel $f\_p_n(x,y)$ by replacing some of the pixels that form part of the weighted mean by their respective filtered values whenever this value is already available in the output buffer.

Experimental results have shown that the proposed filtering method is capable of providing concrete advantages in terms of both image quality and encoding/compression efficiency, and this notwithstanding the fact that it calls for the allocation of only modest computational and memory resources. This renders use of the method of the present invention particularly advantageous in applications that call for real-time processing capacity.

Figure 8:
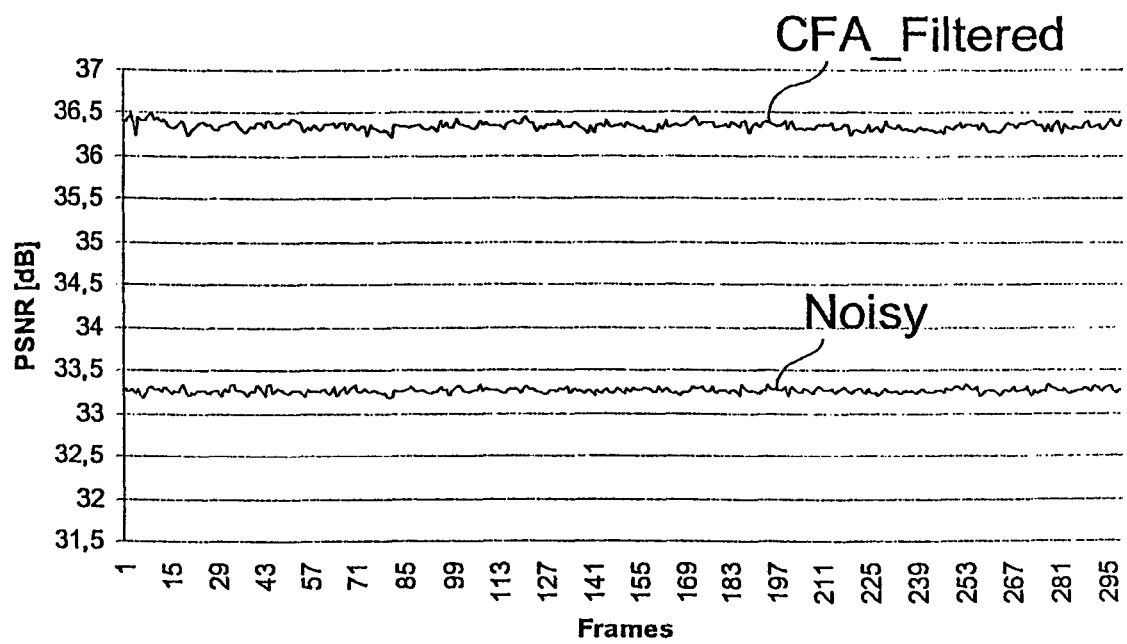
FIG. 8 is a graph that illustrates the experimental results.

Referring to FIG. 8, the curve denominated "CFA_filtered" reproduces, image by image, a quality measure for a sequence of three hundred images that were filtered in accordance with the present invention. The measure was obtained from filtered and interpolated images.

The second curve in FIG. 8, indicated by the denomination "Noisy", reproduces the same measure as obtained on the same sequence prior to filtering; in this case, once again, the measure was obtained from interpolated images.

The results of FIG. 8 refer, in particular, to a measure known as PSNR (Peak-to-Peak Signal to Noise Ratio). The PSNR is a standard measure and is representative of the quality of an image; more particularly, it indicates the signal quantity present in an image as compared with the quantity of noise.

The results of FIG. 8 show that the filtered sequence is characterized by a higher PSNR measure (the gain is typically of the order of 3 dB), which is indicative of a better quality.

Figure 9:
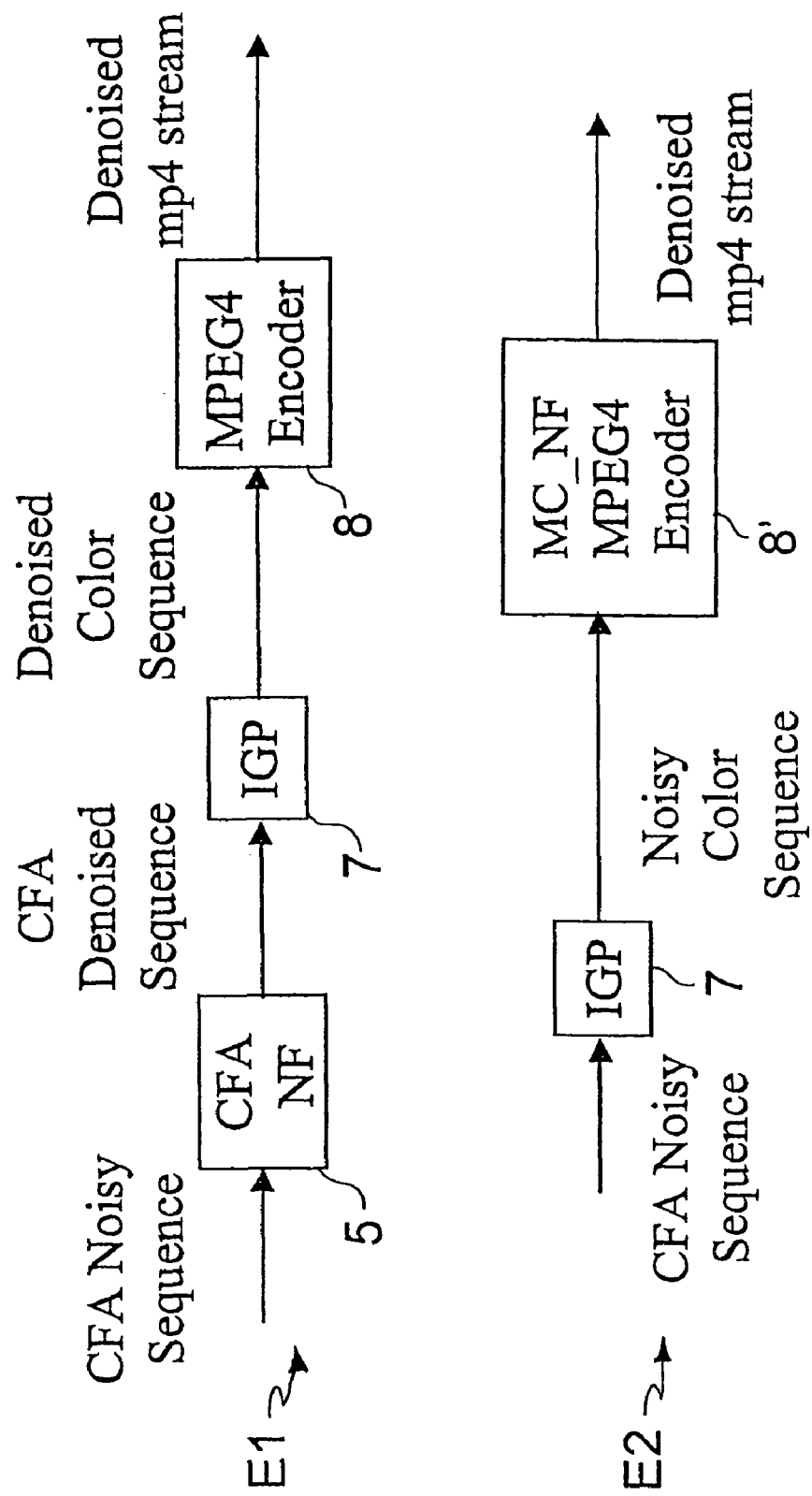
FIG. 9 is a schematic illustration of two filtering architectures, the first in accordance with the present invention, the second of a conventional type.

FIG. 9 shows two processing schemes that can be used for obtaining a sequence of filtered images encoded/compressed in accordance with the MPEG4 standard from a sequence of noisy CFA images.

More particularly, in the first of the two procedures, here denominated E1, the CFA images are filtered by means of a method in accordance with the present invention by the filter 5 (CFA NF), after which they are interpolated by the block 7 (IGP) and encoded/compressed by the block 8 (MPEG4-Encoder).

In the other procedure, here denominated E2, the noisy CFA images are first interpolated by the block 7 (IGP), after which—following a conventional filtering scheme—they are filtered by means of a filtering method with motion compensation immediately prior to MPEG encoding/compression in Block 8, this method being indicated as MC_NF. In particular, the MC_NF method uses the motion estimate and the motion compensation of the MPEG encoder to perform a spatio-temporal digital filtering with motion compensation.

Experimental results have shown that processing procedure E1, i.e., the one in accordance with the present invention, makes it possible to obtain a gain of 20% in terms of bit rate with respect to the conventional procedure E2.

This can be explained by considering the fact that processing procedure E2 estimates the motion and the motion compensation from images that are affected by noise and cannot therefore furnish an optimal result, with consequent adverse effects as regards both image quality and compression efficiency.

The filtering method in accordance with the invention, which has been described hereinabove by reference to a preferred embodiment, can be implemented by utilizing hardware, software or a combination of hardware and software. In the latter case the method may be implemented in an application-specific integrated circuit (ASIC circuit).

When it is implemented in a device for acquiring image sequences, the method in accordance with the present invention can be advantageously carried out by means of processing resources (DSP, for example) shared with other applications within the said device.

Obviously, a person skilled in the art, especially when having to satisfy contingent and specific needs, could introduce numerous modifications and variants into the proposed method of filtering a digital image sequence, though without thereby overstepping the protection limits of the invention as defined by the claims set out hereinbelow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for filtering the noise of a sequence of digital images in video format comprising:
    processing a first video image of the sequence to obtain a corresponding improved video image with reduced noise;
    processing at least one pixel of a second video image of the sequence that temporally follows said first video image, said processing the at least one pixel providing a corresponding filtered pixel and said processing the at least one pixel including:
        selecting a first set of pixels including the at least one pixel and a plurality of pixels of the second video image spatially adjacent to the at least one pixel;
        selecting a second set of pixels including pixels of the corresponding improved video image homologous with the pixels of said first set of pixels;
        carrying out a digital filtering of a first type using pixels from said first set of pixels selected from the second video image and pixels from said second set of pixels selected from the corresponding improved video image to generate the corresponding filtered pixel.

2. A method in accordance with claim 1, further comprising:
    carrying out a first evaluation of motion of the at least one pixel, using pixels forming part of said first set of pixels and part of said second set of pixels; and in which said at least one pixel is such that said first evaluation of motion is smaller than a first threshold value.

3. A method in accordance with claim 2, further comprising:
    producing a provisional filtered pixel in accordance with a Duncan Range Test, said provisional filtered pixel obtained from a subset of pixels from part of said first set of pixels and part of said second set of pixels.

4. A method in accordance with claim 3, further comprising:
    carrying out a second evaluation of motion of the at least one pixel and when said at least one pixel is such that said second evaluation of motion is smaller than a second threshold value, then setting said corresponding filtered pixel according to the provisional filtered pixel.

5. A method in accordance with claim 3, further comprising:
    carrying out a second evaluation of motion of the at least one pixel and when said at least one pixel is such that said second evaluation of motion is not smaller than a second threshold value, then deriving said corresponding filtered pixel after subjecting the provisional filtered pixel to a smoothing operation.

6. A method in accordance with claim 1, further comprising:
    processing another pixel of said second video image, said processing the another pixel providing a corresponding another filtered pixel and said processing the another pixel including:
        selecting a third set of pixels including the another pixel and a plurality of pixels of the second video image spatially adjacent to it;

selecting a fourth set of pixels including pixels of the improved video image homologous with the pixels of said third set of pixels;

carrying out another evaluation of motion of the another pixel, using pixels forming part of said third set of pixels and part of said fourth set of pixels;

whenever the another evaluation of motion is smaller than said first threshold value, carrying out a digital filtering of a second type that generates the another filtered pixel by using exclusively pixels forming part of said third set of pixels.

7. A method in accordance with claim 6, further comprising:

estimating for the another pixel another statistical parameter representative of the noise present on the pixels of said third set of pixels, said another statistical parameter estimated according to a specific color of the another pixel, the digital filtering of the second type utilizing said another parameter.

8. A method in accordance with claim 1, wherein each video image of the sequence is made up of a respective pixel matrix, the pixels of said respective pixel matrix being associated on the basis of their respective positions with one of a set of chromatic components, and wherein said first set of pixels and said second set of pixels comprise pixels associated with the same chromatic component of the at least one pixel.

9. A method in accordance with claim 8, wherein each video image of the sequence is in Bayer CFA format and said chromatic components form part of the set including the color red, the color green and the color blue.

10. A method in accordance with claim 9, wherein selecting the first set of pixels aligns a selection matrix according to the chromatic component of the at least one pixel, the selection matrix being such as to select pixels that are situated in the neighborhood of the at least one pixel and having the same chromatic component as said at least one pixel and discard pixels having a different chromatic component as said at least one pixel, the selection matrix being identical for the chromatic components red and blue.

11. A method in accordance with claim 1 further comprising:

estimating a statistical parameter $\sigma_n^{GL}$ representative of global noise present in said first video image, the digital filtering of the first type utilizing said statistical parameter.

12. A method in accordance with claim 11, further comprising:

selecting a plurality of pixels of the first video image;

calculating a plurality of local estimates;

wherein calculating the plurality of local estimates includes calculating for each given pixel of said plurality of pixels a respective estimate of a statistical parameter representative of local noise present in a neighborhood of the given pixel; and wherein said estimate of the statistical global noise parameter $\sigma_n^{GL}$ is obtained from said plurality of local estimates.

13. A method in accordance with claim 12, wherein said local estimates are local variance measures.

14. A method in accordance with claim 12, wherein said plurality of pixels includes pixels forming part of homogeneous regions of the first video image.

15. A method in accordance with claim 1, further comprising:

identifying a subset of pixels from part of said first set of pixels and part of said second set of pixels during a selection phase carried out in accordance with a Duncan Range Test, wherein said digital filtering of the first type utilizes the subset of pixels.

16. A method in accordance with claim 15 wherein identifying said subset of pixels includes forming a selection interval of pixels similar to the pixel to be filtered, said pixels similar to the pixel to be filtered correlated with the standard deviation of the noise to be filtered.

17. A computer readable memory programmed to direct a filter for reducing noise in a sequence of images in CFA format, the filter operable in accordance with the method of claim 1.

18. An acquisition device, comprising:

a sensor including a CFA filter, wherein the sensor is operable to acquire a sequence of digital images in CFA format, and wherein the CFA filter is operable to process the sequence of digital images in CFA format in accordance with the method of claim 1.

19. A method of filtering noise from a digital video image comprising:

processing a first image to generate an improved image;

processing a second, subsequent image after processing the first image;

selecting a first pixel from the second, subsequent image during the processing of the second, subsequent image;

selecting a first set of pixels in the second, subsequent image that have a predetermined spatial relationship to the first pixel;

locating a second set of pixels in the first image that correspond to the first set of pixels in the second, subsequent image; and filtering the first pixel using data from both the first set of pixels and the second set of pixels.

20. The method according to claim 19 further comprising:

performing spatial filtering on the first pixel;

determining a motion component between the first set of pixels and the second set of pixels; and carrying out a motion compensator filtering if the motion component between the first set of pixels and the second set of pixels is above a selected threshold and not carrying out motion compensation filtering if the motion component between the first set of pixels and the second set of pixels is below a selected threshold.

* * * * *